(12) United States Patent
Fukuda et al.

(10) Patent No.: US 7,519,956 B2
(45) Date of Patent: Apr. 14, 2009

(54) METHOD FOR GENERATING DOCUMENT COMPONENTS AND MANAGING SAME

(75) Inventors: Kentaro Fukuda, Sagamihara (JP); Takuya Nakaike, Yokohama (JP); Hironobu Takagi, Yokohama (JP); Takashi Ito, Machida (JP)

(73) Assignee: International Business Machines Corporation, Armonk, NY (US)

( * ) Notice: Subject to any disclaimer, the term of this patent is extended or adjusted under 35 U.S.C. 154(b) by 751 days.

(21) Appl. No.: 10/845,732

(22) Filed: May 14, 2004

(65) Prior Publication Data
US 2004/0230890 A1 Nov. 18, 2004

(30) Foreign Application Priority Data
May 14, 2003 (JP) .............................. 2003-135413

(51) Int. Cl.
G06F 9/44 (2006.01)
G06F 9/45 (2006.01)

(52) U.S. Cl. ...................... 717/125; 717/106; 717/130; 717/136

(58) Field of Classification Search ......... 717/110–113, 717/124–125, 127–128, 130–133
See application file for complete search history.

(56) References Cited

U.S. PATENT DOCUMENTS

| | | | | |
|---|---|---|---|---|
| 5,911,145 | A * | 6/1999 | Arora et al. .................. | 715/514 |
| 6,330,566 | B1 * | 12/2001 | Durham .................... | 707/104.1 |
| 6,446,097 | B1 * | 9/2002 | Glaser ........................ | 715/513 |
| 6,558,431 | B1 * | 5/2003 | Lynch et al. ................ | 715/513 |
| 7,000,184 | B2 * | 2/2006 | Matveyenko et al. ........ | 715/530 |
| 7,110,936 | B2 * | 9/2006 | Hiew et al. .................... | 703/22 |
| 7,174,536 | B1 * | 2/2007 | Kothari et al. .............. | 717/109 |
| 7,191,405 | B1 * | 3/2007 | Jaramillo ..................... | 715/763 |
| 7,194,680 | B1 * | 3/2007 | Roy et al. ................... | 715/513 |
| 7,316,003 | B1 * | 1/2008 | Dulepet et al. .............. | 717/111 |
| 2002/0095660 | A1 * | 7/2002 | O'Brien et al. ............. | 717/127 |
| 2002/0169900 | A1 * | 11/2002 | Hiji ............................. | 710/22 |
| 2004/0049530 | A1 * | 3/2004 | Lok et al. .................... | 709/201 |
| 2004/0148576 | A1 * | 7/2004 | Matveyenko et al. ........ | 715/530 |
| 2005/0229101 | A1 * | 10/2005 | Matveyenko et al. ........ | 715/530 |

(Continued)

OTHER PUBLICATIONS

Souza "Bobby Buy Bolsters Watchfire's Accessibility Ptich" Aug. 2002, Forrester Research, Inc.*

(Continued)

*Primary Examiner*—Lewis A Bullock, Jr.
*Assistant Examiner*—Jason Mitchell
(74) *Attorney, Agent, or Firm*—Richard Goldman; Shimokaji & Associates, PC

(57) ABSTRACT

Method, system, and program product for analyzing a generation program for generating document information consisting of a plurality of document components. The the generation program contains commands for generating the document components, contained in the document information. The information processing system includes: a correspondence information generator for executing the generation program and generating correspondence information which indicates correspondence between the plurality of generating commands and document components generated by the generating commands; a selector for selecting any of the plurality of document components at the instruction of a user; and a command information output unit for selecting, based on the correspondence information, the generating command which has generated the document component selected by the selector and outputting information for identifying the generating command.

1 Claim, 10 Drawing Sheets

U.S. PATENT DOCUMENTS

2005/0229154 A1* 10/2005 Hiew et al. .................. 717/110
2006/0111888 A1* 5/2006 Hiew et al. .................... 703/22

OTHER PUBLICATIONS

"DM News Service: Macromedia Introduces Dreamweaver UltraDev" May 2000.*

Hallo gram, "Dreamweaver UltraDev", 2000, Hallo gram Publishing.*

Filippo Ricca and Paolo Tonella, Web Application Slicing.

"Bobby", http://bobby.watchfire.com/bobby/html/en/manualdownloadable.jsp, "Bobby: Getting Started".

* cited by examiner

| Type of specification command | Meaning of specification command |
| --- | --- |
| Text | Text data such as HTML tags |
| Expression | Java® formula described using <%=%> |
| Scriptlet | Java® code enclosed by <% %> |
| JSP Directive | Declaration which specifies taglib, encode, etc |
| JSP Tag | Operation tags for Java® Beans, etc |
| Tag Library | Taglib |

```
<filter>
    <filter-name>Observer Filter</filter-name>
    <filter-class>Observer Filter</filter-class>
</filter>

<filter-mapping>
    <filter-name>Observer Filter</filter-name>
    <servlet-name>/*</servlet-name>
</filter-mapping>
```

(b)

```
filtername4 = html
html.classname = PortalObserverFilter
```

(c)

```
filtername2 = ObserverFilter
ObserverFilter.classname = PortletObserverFilter
```

370 java.lang.Exception
    at ObservedPrintWriter.write(ObservedPrintWriter.java:94)
    at org.apache.jasper.runtime.JspWriterImpl.write(JspWriterImpl.java:360)
    at org.apache.jasper.runtime.JspWriterImpl.write(JspWriterImpl.java:383)
    at org.apache.jsp.date$jsp._jspService(date$jsp.java:124)
    at org.apache.jasper.runtime.HttpJspBase.service(HttpJspBase.java:107)
    ...

(b)

370 java.lang.Exception
    at ObservedPrintWriter.write(ObservedPrintWriter.java:83)
    at java.io.PrintWriter.print(PrintWriter.java:360)
    at ObservedPrintWriter.print(ObservedPrintWriter.java:65)
    at java.io.PrintWriter.println(PrintWriter.java:497)
    at ObservedPrintWriter.println(ObservedPrintWriter.java:71)
    at SnoopServlet.doGet(SnoopServlet.java:125)
    at javax.servlet.http.HttpServlet.service(HttpServlet.java:740)
    ...

Figure 6

METHOD FOR GENERATING DOCUMENT COMPONENTS AND MANAGING SAME

SUMMARY OF THE INVENTION

1. Field of the Invention

The present invention relates to an information processing system, control method, control program, and recording medium. More particularly, it relates to an information processing system which analyzes a generation program for generating document information as well as its control method, control program, and recording medium.

2. Background Art

Conventionally, software known as a debugger is used to efficiently detect programming errors (bugs). Examples of debuggers include Visual Age for Java from the International Business Machines Corporation, WebSphere Studio Application Developer from the International Business Machines Corporation, JBuilder from Borland Software Corporation, Interstage APWORKS from Fujitsu Ltd., etc. These debuggers execute commands in a program one by one and output execution results of each command. This allows the programmers and the like to know the course of program execution and helps them modify the program.

However, although conventional debuggers are suitable for studying details of program operation, they are not suitable for detecting a problem area in a program. For example to detect a problem area in a program with a conventional debugger, the programmer must execute commands one by one in sequence from the beginning of the program until the program malfunctions. This is troublesome.

In an alternative method, if the program to be debugged outputs characters, the programmer inserts an output process (e.g., a PRINT statement) temporarily near a part where an error should exist. This allows the programmer to narrow down the problem area gradually by comparing the output resulting from the output process with the output resulting from the original program. This method is more troublesome because the programmer must rewrite the program each time it is executed.

Thus, the object of the present invention is to provide an information processing system, control method, control program, and recording medium which can solve the above problem. This object is achieved by a combination of features set forth in the independent claims herein. The dependent claims further present advantageous concrete examples of the present invention.

SUMMARY OF THE INVENTION

One aspect of the present invention provides an information processing system which analyzes a generation program for generating document information consisting of a plurality of document components as well as provides a control method and control program for controlling the information processing system, and recording medium containing the control program, wherein: the generation program contains a plurality of generating commands for generating the plurality of document components, respectively, contained in the document information; and the information processing system comprises: a correspondence information generator for executing the generation program and generating correspondence information which indicates correspondence between the plurality of generating commands and document components generated by the generating commands; a selector for selecting any of the plurality of document components at the instruction of a user; and a command information output unit for selecting, based on the correspondence information, the generating command which has generated the document component selected by the selector and outputting information for identifying the generating command.

Incidentally, the above summary of the invention does not enumerate all the necessary features of the present invention, and subcombinations of above features can also constitute inventions.

BRIEF DESCRIPTION OF THE DRAWINGS

FIG. 4 is a diagram illustrating details of specification commands to be translated by a program translator 210;

FIG. 5(a) shows a first example of a configuration file which specifies how a function identification information collector 250 should insert a filter function;

FIG. 5(b) shows a second example of a configuration file which specifies how the function identification information collector 250 should insert a filter function;

FIG. 5(c) shows a third example of a configuration file which specifies how the function identification information collector 250 should insert a filter function;

FIG. 6(a) shows a first example of a stack trace information 370;

FIG. 6(b) shows a second example of the stack trace information 370;

DETAILED DESCRIPTION OF THE INVENTION

The present invention will be described below by way of an embodiment of the invention, but the embodiment below is not intended to limit the claimed invention and a combination of all the features described in the embodiment is not necessarily essential for the solution of the invention.

Figure 1:
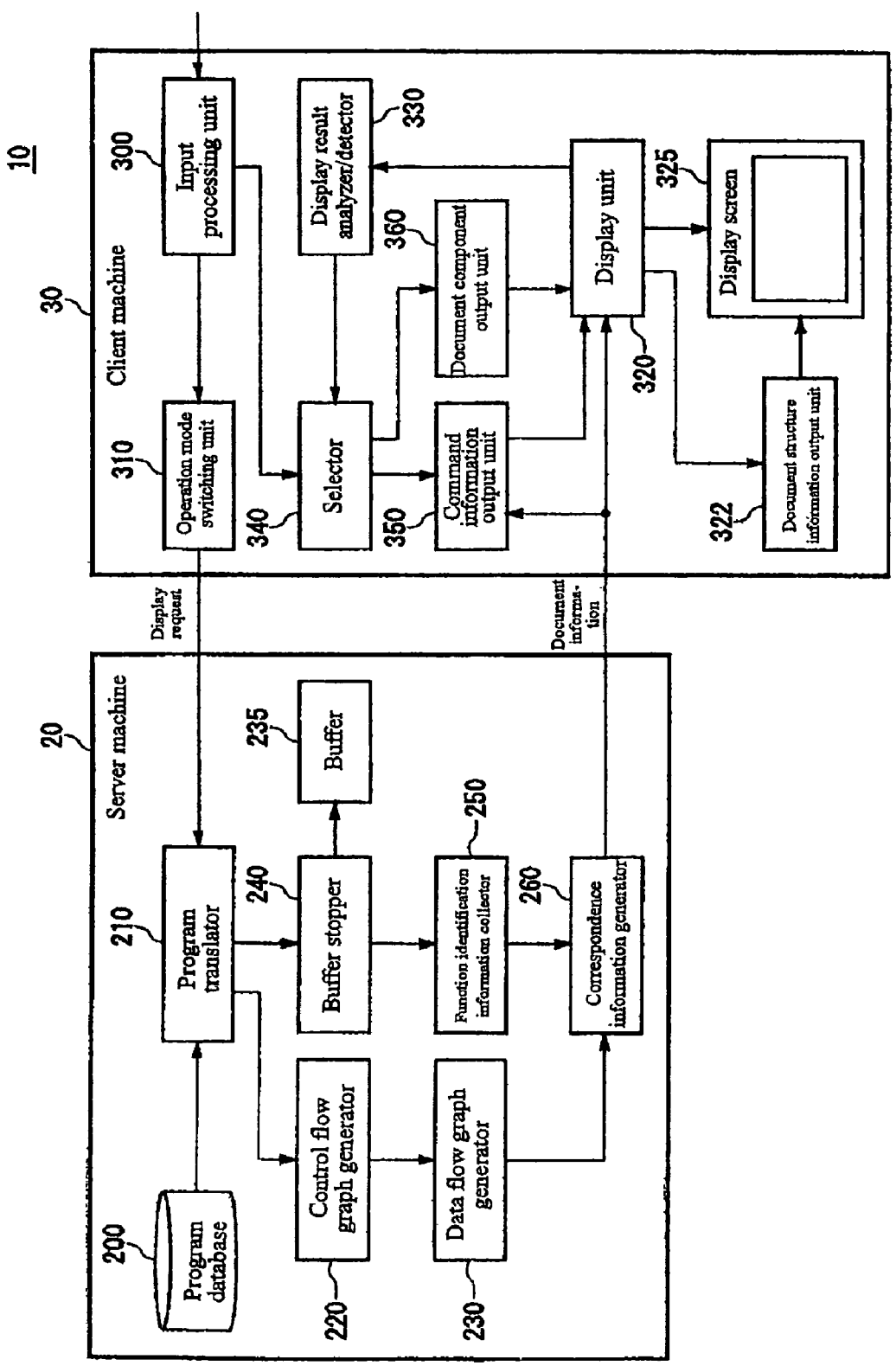
FIG. 1 shows a functional block diagram of an information processing system 10.

FIG. 1 shows a functional block diagram of an information processing system 10. The information processing system 10, for example, is a World Wide Web (WWW) system and is intended to analyze a generation program which generates document information provided as HTML documents and the like. The information processing system 10 comprises a server machine 20, such as a Web server, which generates HTML documents and a client machine 30 for viewing the HTML documents generated by the server machine 20. Incidentally, according to this embodiment, the server machine 20 is installed separately from the client machine 30 and communicates with the client machine 30 via a telecommunications line such as a LAN, a WAN, or the Internet. Alternatively, the server machine 20 and client machine 30 may be installed in the same housing. That is, the information processing system 10 may be provided to the user as a single unit.

The server machine 20 comprises a program database 200, program translator 210, control flow graph generator 220, data flow graph generator 230, buffer 235, buffer stopper 240, function identification information collector 250, and correspondence information generator 260. The program database 200 stores a generation program for generating document information consisting of a plurality of document components such as HTML documents. An HTML document is an example of a tagged document which contains contents information to be displayed to viewers of the document information and tag information that specifies display format of the contents information. Alternatively, the document information may consist of XML documents or other tagged documents.

The generation program contains a plurality of generating commands for generating the respective document components contained in the document information. The generation program, for example, is a servlet program written in the Java® language. Each of the generating commands outputs document information by calling an output function (e.g., a method) which outputs the document component generated by the given generating command. The output function, for example, is an output method in the Writer class, the OutputStream class, or another class which is obtained through expansion or utilization thereof if the generation program is written in the Java® language.

The program database 200 further stores a specification program which is to be translated into a generation program and which specifies content of the document components to be generated by the generation program. For example, it stores a JSP program compliant with JSP (Java® Server Pages) standards as the specification program.

The program translator 210 receives an operation mode setting instruction from the operation mode switching unit 310, specifying which operation mode the server machine 20 should operate in: a test mode in which the server machine 20 analyzes the generation program or a normal mode in which the server machine 20 runs without analyzing the generation program. The program translator 210 receives a display request, such as an HTTP request, to display Web pages or the like and acquires the generation program or specification program from the client machine 30 depending on the received display request. Next, the program translator 210 translates the specification program into a generation program, for example, by compiling it. Then, the program translator 210 sends the generation program resulting from the translation or the generation program acquired from the program database 200 to the buffer stopper 240 together with operation mode setting instruction. If the operation mode setting instruction specifies the test mode, the program translator 210 sends the generation program to the control flow graph generator 220.

The control flow graph generator 220 generates a control flow graph which represents an execution flow of a plurality of generating commands executed in sequence in the generation program received from the program translator 210 and sends it to the data flow graph generator 230 together with the generation program. The data flow graph generator 230 generates a data flow graph which indicates what other command should use data generated by one command in the generation program received from the control flow graph generator 220 and sends it to the correspondence information generator 260 together with the control flow graph.

The buffer 235 has a storage area for storing at least one document component generated by the generation program and outputs the at least one document component stored in the storage area, as part of the document information with a predetermined timing. Besides, the buffer 235 stops storing document components at the instruction of the buffer stopper 240.

The buffer stopper 240 stops the buffer 235 from storing document components if the operation mode setting instruction received from the operation mode switching unit 310 specifies the test mode. Consequently, each time a document component is generated by the generation program, the buffer stopper 240 allows it to be output as part of the document information. Specifically, the buffer stopper 240 stops the buffer 235 from storing document components by setting the size of an output buffer used by the generation program received from the program translator 210 to '0.' Then, the buffer stopper 240 sends the generation program to the function identification information collector 250.

Each time any output function of the generation program outputs a document component, the function identification information collector 250 collects function identification information that associates the document component with the output function which has output the document component and the generating command which has called the output function.

Specifically, the function identification information collector 250 inserts, in the generation program, a filter function which is executed each time the generation program is executed. Instead of the output function which outputs a document component, the function identification information collector 250 causes a monitor function which outputs a document component and monitors the output to be executed in the filter function. For example, as a monitor function, the function identification information collector 250 inserts the process of outputting a hierarchical structure of the functions which have been called before the monitor function is called. Consequently, based on the hierarchical structure of functions outputted each time a monitor function is executed, the function identification information collector 250 identifies the document component outputted by the monitor function and the generation program which has called the monitor function by associating them with each other. Then, the function identification information collector 250 sends the generation program in which the filter function and the like are inserted to the correspondence information generator 260.

To take an example, if the generation program is written in the Java® language, by generating an exception in a monitor function, the function identification information collector 250 outputs a stack trace which represents the state of a stack used for function calls, as information which represents the hierarchical structure of functions.

The correspondence information generator 260 generates document information by executing the generation program received from the function identification information collector 250. The correspondence information generator 260 generates correspondence information which indicates correspondence between the generating commands and respective document components generated by the generating commands. Then, the correspondence information generator 260 sends the control flow graph received from the control flow graph generator 220, data flow graph received from the data flow graph generator 230, generation program, document information, and correspondence information to a display unit 320 and command information output unit 350.

The client machine 30 comprises an input processing unit 300, the operation mode switching unit 310, the display unit 320, a document structure information output unit 322, a display screen 325, a display result analyzer/detector 330, a selector 340, the command information output unit 350, and a document component output unit 360. The input processing unit 300 accepts a display request to display Web pages from a viewer of Web pages or the like and transfers the display request to the operation mode switching unit 310. According to the content of the display request, the operation mode switching unit 310 switches between a test mode in which the command information output unit 350 outputs information for identifying the generating command and a normal mode in which the command information output unit 350 stops outputting the information for identifying the generating command. Specifically, together with the display request to display Web pages, the command information output unit 350 sends the server machine 20 an operation mode setting instruction, specifying which operation mode the server machine 20 should operate in, the test mode or normal mode.

The display unit 320 displays the document information received from the server machine 20 on the display screen 325 as well as sends it to the document structure information output unit 322 and the display result analyzer/detector 330. Also, the display unit 320 displays the generation program received from the server machine 20 on the display screen 325. Furthermore, the display unit 320 displays the information received from the command information output unit 350 and the document component output unit 360 on the display screen 325. The document structure information output unit 322 generates document structure information about the structure of the received document information such as an HTML document and displays it on the display screen 325. In addition, the display unit 320 may reproduce the information received from the command information output unit 350 and the document component output unit 360 as voice output. In other words, the information outputted by each of the command information output unit 350 and the document component output unit 360 via the display unit 320 is not limited to images, and may be audio information produced by a speech reading technology.

Upon receiving the document information from the display unit 320, the display result analyzer/detector 330 analyzes whether the user can readily recognize displayed objects displayed based on the document information. Specifically, ease-of-recognition conditions have been established to indicate whether viewers can recognize displayed objects displayed on the display screen 325, and the display result analyzer/detector 330 detects hard-to-recognize objects which do not satisfy the ease-of-recognition conditions and sends them to the selector 340.

The selector 340 selects one of the document components in the document information based on instructions received from the viewer via the input processing unit 300 or detection results received from the display result analyzer/detector 330 and sends it to the command information output unit 350. For example, if the document information is provided as HTML documents, the selector 340 selects tag information which specifies contents information about any of the HTML documents or display format of the contents information. Also, the selector 340 selects one of the generating commands in the generation program according to instructions entered by the user via the input processing unit 300 and sends it to the document component output unit 360.

The command information output unit 350 selects the contents information or tag information about the generating command which has generated the document component such as an HTML document selected by the selector 340, based on the correspondence information received from the correspondence information generator 260. Then, the command information output unit 350 outputs information which identifies the generating command to the display unit 320 via the display screen 325. If the document component selected by the selector 340 has been specified by a JSP program, the command information output unit 350 may select the specification command which has specified the content of the document component, based on the correspondence information, and further outputs identification information about the specification command. The document component output unit 360 selects the document component generated by the generating command selected by the selector 340, based on the correspondence information received from the correspondence information generator 260, and displays it on the display screen 325.

As described above, the server machine 20 executes the generation program for generating document information and generates the correspondence information which indicates correspondence between the generating commands and the respective document components generated by the generating commands. On the other hand, the client machine 30 selects a document component at the instruction of the user and outputs the generating command which corresponds to the document component. This allows the author of the generation program to properly identify the generating command which corresponds to a desired document component.

Figure 2:
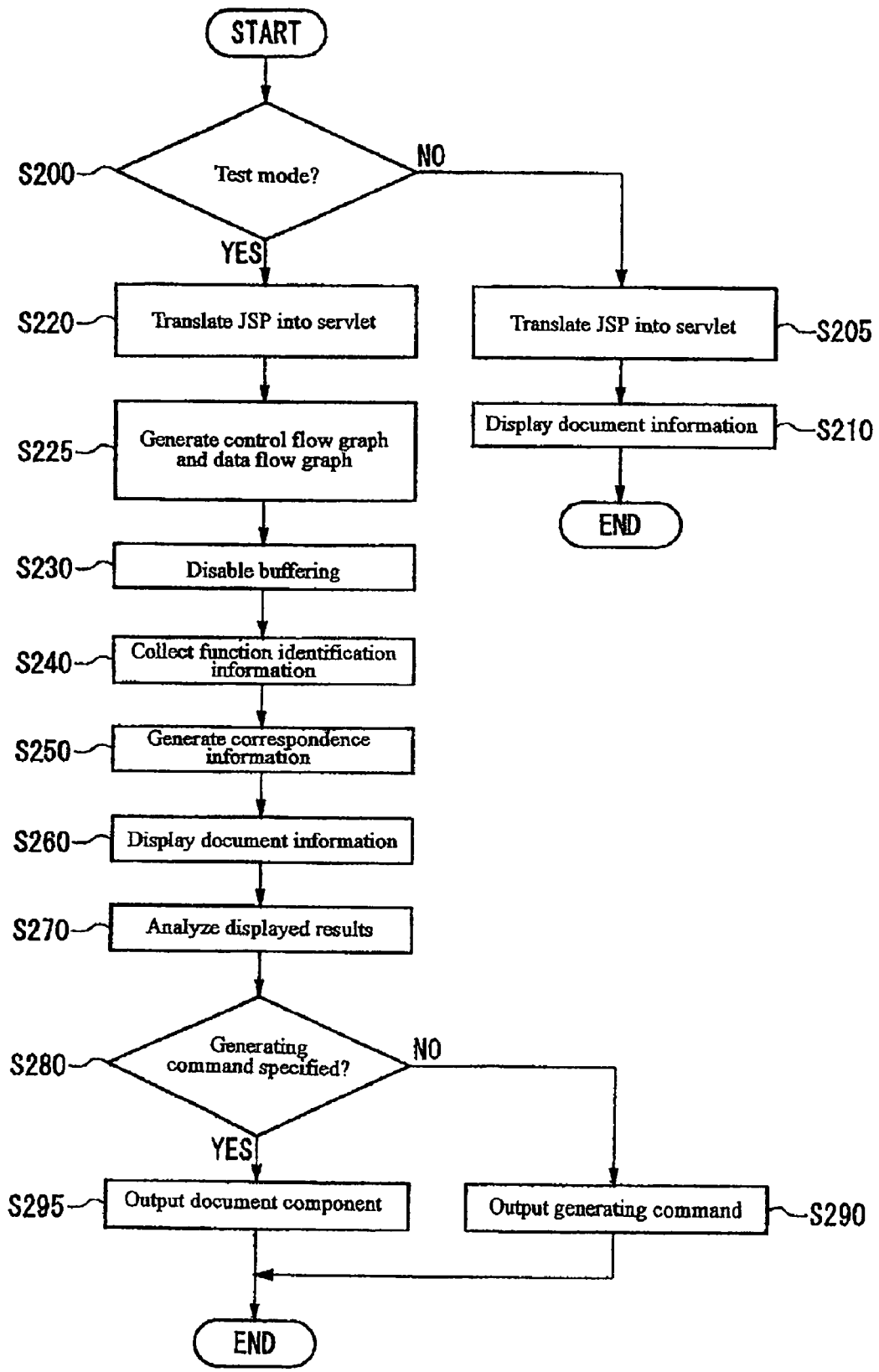
FIG. 2 shows a flowchart of the information processing system 10.

FIG. 2 shows a flowchart of the information processing system 10. Based on instructions received from the user, the operation mode switching unit 310 determines whether to operate the server machine 20 in the test mode (S200). If the server machine 20 will not be operated in the test mode (S200: NO), the program translator 210 acquires a specification program such as a JSP program from the program database 200 according to an HTTP request received from the client machine 30 and translates it into a generation program (S205). Then, the information processing system 10 performs normal processing—presents displayed objects on the display screen 325 of a Web browser or the like based on an HTML document generated by the generation program—and finishes processing (S210).

On the other hand, when operating the server machine 20 in the test mode (S200: YES), the program translator 210 acquires a specification program such as a JSP program from the program database 200 according to an HTTP request received from the client machine 30 and translates it into a generation program (S220).

The control flow graph generator 220 generates a control flow graph which represents an execution flow of a plurality of generating commands executed in sequence in the generation program resulting from the translation (S225). On the other hand, the data flow graph generator 230 generates a data flow graph which indicates what other command should use data generated by one command in the generation program resulting from the translation.

Then, the buffer stopper 240 stops the buffer 235 from storing document components because the operation mode switching unit 310 has set the operation mode to the test mode (S230). Consequently, each time a document component is generated by the generation program, the buffer stopper 240 outputs it as part of the document information. The function identification information collector 250 inserts a filter function in an output function to collect function identification information that associates document components with output functions and generating commands (S240).

The correspondence information generator 260 executes the generation program received from the function identification information collector 250 to generate document information. Then, the correspondence information generator 260 generates correspondence information which indicates correspondence between the generating commands and respective document components generated by the generating commands (S250). Incidentally, according to this example, the correspondence information generator 260 generates correspondence information about all the document components generated by the generation program. Alternatively, the correspondence information generator 260 may generate correspondence information about the document components which satisfy a predetermined condition. The predetermined condition here may be that the document component is output on predetermined lines in the document information or that the document component matches a predetermined character string. In that case, the correspondence information generator 260 can reduce the time required to execute the generation program.

Next, the display unit 320 displays the document information on the display screen 325 (S260). Then, the display result analyzer/detector 330 detects the hard-to-recognize objects which do not satisfy the ease-of-recognition conditions (S270). If the user specifies a generating command on the display screen 325 via the input processing unit 300 (S280: YES), the document component output unit 360 identifies the document component generated by the generating command, based on the correspondence information, and outputs it to the display screen 325 (S295). On the other hand, if the user specifies a generating command on the display screen 325 via the input processing unit 300 (S280: NO), the document component output unit 360 identifies the generating command which has generated the document component, based on the correspondence information, and outputs it to the display screen 325 (S290).

The information processing system 10 repeats the above sequence of operations each time the client machine 30 sends a Web page display request to the server machine 20.

Figure 3:
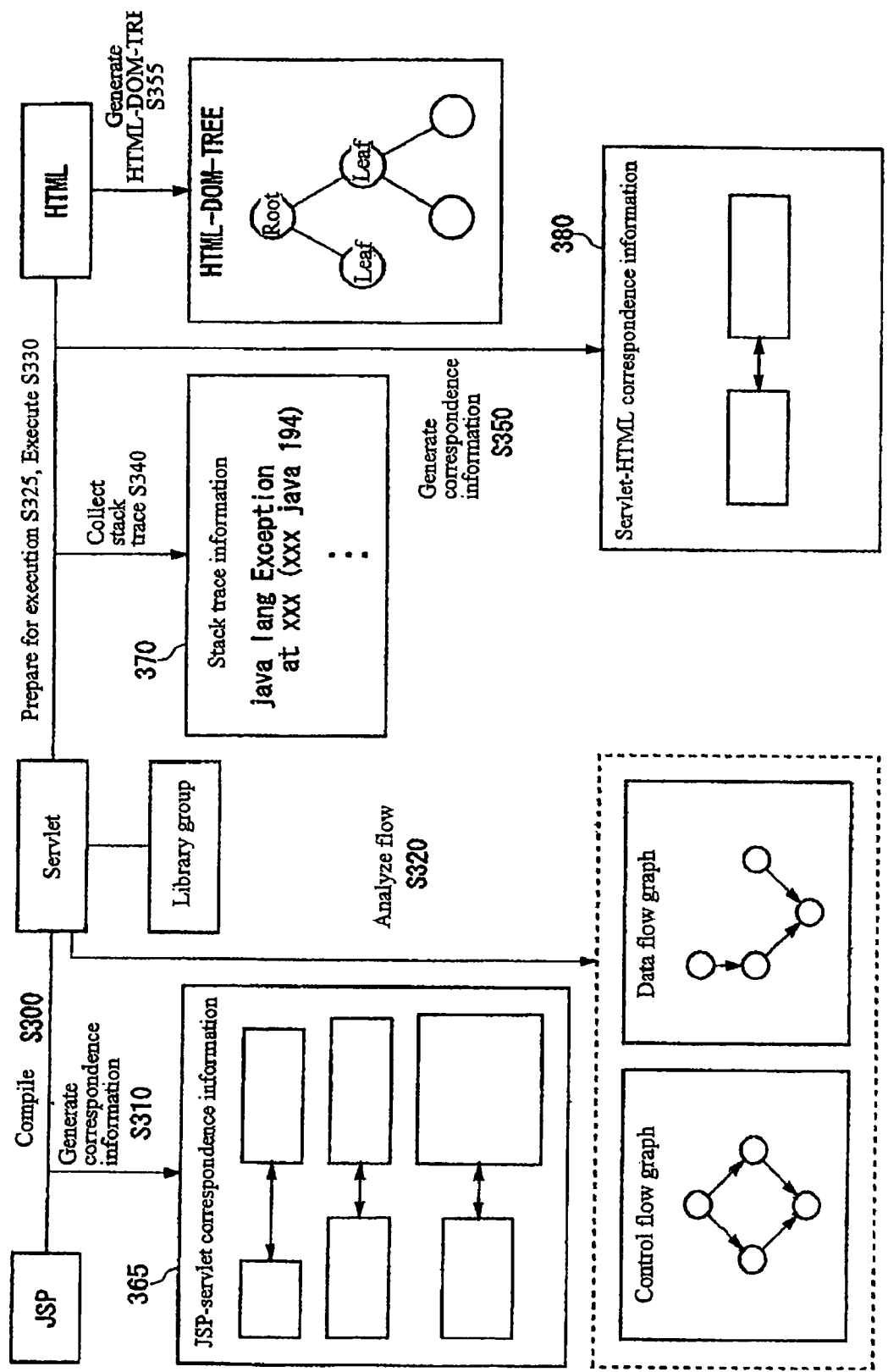
FIG. 3 shows a conceptual diagram of the information processing system 10.

FIG. 3 shows a conceptual diagram of operation of the information processing system 10. With reference to the figure, generation and selection of document components will be described in more detail. The program translator 210 compiles a JSP program, and thereby translates it into a servlet program (S300). Then, the program translator 210 generates JSP-servlet correspondence information 365 which associates a plurality of specification commands in the JSP program with respective generating commands translated from the specification commands (S310).

The control flow graph generator 220 generates a control flow graph of the generation program resulting from the translation (S320). On the other hand, the data flow graph generator 230 generates a data flow graph in the generation program resulting from the translation.

As preparation for execution of the generation program (S325), the buffer stopper 240 sets the size of the output buffer used by the generation program to '0' and thereby stops the buffer 235 from storing the output from the generation program. On the other hand, the function identification information collector 250 inserts a filter function in the generation program to collect function identification information that associates document components with the generating commands which have generated the document components.

The correspondence information generator 260 executes the generation program received from the function identification information collector 250, together with a library group as required, and thereby generates document information such as an HTML document (S330).

Then, the correspondence information generator 260 generates correspondence information which indicates correspondence between the generating commands and respective document components generated by the generating commands.

To take an example, if the generation program is written in the Java$^\circ$ language, by inserting the process of generating exceptions in monitor functions, the function identification information collector 250 collects stack trace information 370 which represents the hierarchical structure of functions at the time when each document component is output (S340). Also, the function identification information collector 250 collects function identification information by associating the generating commands contained in the stack trace information 370 with the document component which is output when the stack trace information 370 is generated.

Consequently, the correspondence information generator 260 can generate correspondence information which indicates correspondence between generating commands and document components: for example, servlet-HTML correspondence information 380 (S350). Preferably, by combining the JSP-servlet correspondence information 365 and servlet-HTML correspondence information 380, the correspondence information generator 260 further generates information which indicates correspondence between a plurality of generating commands in the JSP program and respective servlet programs generated by the generating commands.

The selector 340 selects one of the document components according to instructions from the user. For example, the document structure information output unit 322 generates document structure information which indicates the structure of an HTML document (S355) and the selector 340 selects a document component by allowing the user to specify a piece of information in the document structure information.

More specifically, tag information in the HTML document may be external tag information that further contains internal tag information in contents information whose display format is specified by the external tag information. In that case, the document structure information output unit 322 generates document structure information (e.g., HTML-DOM-TREE) which is a tree-structured graph with the external tag information represented as a root node and the internal tag information represented as a leaf node of the root node. Furthermore, if the contents information whose display format is specified by the internal tag information further contains internal tag information, the document structure information output unit 322 expresses the latter internal tag information as a leaf node of a leaf node. To take an example, the document structure information output unit 322 may generate structure information which describes the syntactic structure of the HTML document. Then, by allowing the user to specify a node in the document structure information thus generated, the selector 340 selects the tag information which corresponds to the specified node.

FIG. 4 is a diagram illustrating details of specification commands to be translated by the program translator 210. The figure shows correspondence between types and meanings of specification commands in a JSP program, which is a type of specification program. The program translator 210 classifies a statement, such as an HTML tag, which is described simply as text data into a "Text" type of specification command. Also, the program translator 210 classifies a statement which begins with tag information '<%=' and ends with '%>' into an "Expression" type of specification command.

Also, the program translator 210 classifies a statement which begins with tag information '<%' and ends with '%>' into a "Scriptlet" type of specification command. Also, the program translator 210 classifies a declaration which specifies a taglib (tag library) and encoding into a "JSP Directive"

type of specification command. Also, the program translator 210 classifies tag information which manipulates Java° Beans and the like into a "JSP Tag" type of specification command. Also, the program translator 210 classifies a statement which describes a taglib into a "Tag Library" type of specification command.

In this way, the program translator 210 classifies specification commands according to predetermined rules. The program translator 210 generates the JSP-servlet correspondence information 365 which indicates what generating command each classified command has been translated into.

FIG. 5(*a*) shows a first example of a configuration file which specifies how the function identification information collector 250 should insert a filter function. If the generation program is a servlet program, the function identification information collector 250 inserts the filter function by adding the description shown in FIG. 5(*a*) to the web.xml file that sets up the execution environment in which the servlet program is executed. More specifically, the function identification information collector 250 inserts the filter function's name referenced in the web.xml file between the <filter-name> tag and </filter-name> tag.

Also, the function identification information collector 250 inserts the class name of the filter function between the <filter-name> tag and </filter-name> tag. This description states that the information processing system 10 calls a predetermined method in the ObserverFilter class each time it executes an output function of the generation program.

Also, the function identification information collector 250 inserts the name of the function into which the filter function is inserted, between the <servlet-name> tag and </servlet-name> tag. For example, '/*' in FIG. 5(*a*) indicates that the filter function should be inserted in all the JSP programs, Servlet programs, and the like in the Web application specified by the web.xml file. Alternatively, the function identification information collector 250 may insert the storage location (e.g., URL: Uniform Resource Locator) of the function into which the filter function is inserted, between the <url-pattern> tag and </url-pattern> tag.

In this way, the function identification information collector 250 inserts the filter function which is executed each time the generation program is executed, by associating it with the function in the generation program into which the filter function is inserted.

FIG. 5(*b*) shows a second example of a configuration file which specifies how the function identification information collector 250 should insert a filter function. Specifically, FIG. 5(*b*) shows a configuration file which specifies how the function identification information collector 250 should insert a filter function in an integration program that displays, on a browser screen, a plurality of partial contents generation programs which operate independently of each other. To take an example, the integration program and partial contents generation programs may be compliant with the Java° Portal API. Specifically, they have been implemented as WebSphere Portal Server by the International Business Machines Corporation. In this case, the integration program, for example, is a Portal program and the partial contents generation programs, for example, are Portlet programs.

The function identification information collector 250 adds the description shown in FIG. 5(*b*) to PortalFilterService.properties, the configuration file which specifies the execution environment of the integration program. For example, the function identification information collector 250 inserts 'filtername4=html' in the first line to indicate that the name of the filter function is 'html.' Also, the function identification information collector 250 inserts 'html.classname=PortalObserverFilter' in the second line to indicate the class of the filter function.

FIG. 5(*c*) shows a third example of a configuration file which specifies how the function identification information collector 250 should insert a filter function. Specifically, FIG. 5(*c*) shows a configuration file which specifies how the function identification information collector 250 should insert a filter function in the partial contents generation programs which create displays, being integrated by the integration program.

The function identification information collector 250 adds the description shown in FIG. 5(*c*) to PortletFilterService.properties, the configuration file which specifies the execution environment of the partial contents generation programs. For example, the function identification information collector 250 inserts 'filtername2=ObserverFilter' in the first line to indicate that the name of the filter function is 'ObserverFilter.' Also, the function identification information collector 250 inserts 'ObserverFilter.classname=PortletObserverFilter' in the second line to indicate the class of the filter function. In this case, the function identification information collector 250 further provides a FilterChain parameter for the partial contents generation programs into which the filter function is inserted and sets the value of this parameter to ObserverFilter.

In this way, the function identification information collector 250 inserts the filter function by a different and appropriate method according to the concrete form of the generation program. Then, the function identification information collector 250 describes, in the inserted filter function, the process of executing a monitor function which monitors document components to be monitored instead of executing the output function of the generation program. Since the monitor function associates the document components with generating commands, the information processing system 10 can identify the document component generated by a generating command each time the generating command is executed.

Instead of the example in FIG. 5(*c*), the function identification information collector 250 may identify a generation program or specification program which will serve as a starting point upon receiving a display request from the user, and may specify in web.xml that the filter function will be executed after the display request is received from the user, but before the generation program is executed. Specifically, the function identification information collector 250 identifies the generation program or specification program which will serve as a starting point upon receiving the display request from the user, by analyzing the structures of the directories in which generation programs, specification program, and web.xml files reside. In that case, even if the information processing system 10 does not have filter processing capability to execute a predetermined program before running various programs, a monitor function can be executed instead of an output function.

As still another example, the function identification information collector 250 may add the capabilities of the monitor function to the output function of the generation program. For example, if the generation program is written in the Java° language, the function identification information collector 250 may implement a ServletResponse class or JspWriter class to add the capabilities of the monitor function. Then, even if the information processing system 10 does not have filter processing capability, it can generate correspondence information without analyzing the starting point of execution at which a display request is received from the user.

FIG. 6(*a*) shows a first example of the stack trace information 370. Specifically, it shows an example of the stack trace information 370 produced by the function identification information collector 250 when a servlet program which is a generation program is translated from a JSP program which is a specification program. In the first line, the function identification information collector 250 outputs, as the stack trace information 370, information to the effect that an exception occurred in the Java⁶ language. Also, in the second line, the function identification information collector 250 outputs information to the effect that the name of the monitor function which caused the exception is ObserverPrintWriter.write and that the monitor function is described in the 94th line of an ObserverPrintWriter.java file.

Furthermore, the function identification information collector 250 outputs information to the effect that the name of the function that has called the monitor function is org.apache.jasper.runtime.JspWriterImpl.write, as the stack trace information 370 in the third line. Also, the function identification information collector 250 outputs the name of the file in which the function is described and the line number of the line which contains the description of the function in the file.

Similarly, the function identification information collector 250 displays the structure of the functions called until the monitor function is called, as the stack trace information 370. Then, the function identification information collector 250 identifies functions beginning with the function which called the monitor function and ending with a predetermined function org.apachejasper.runtime.HttpJasBase.service which starts the generation program, as the hierarchical structure of functions which have called the output function. For example, according to the stack trace information 370 shown in FIG. 6(a), the function identification information collector 250 can identify that the generating command which calls the output function is described in the 124th line of a generation program date$jsp.java.

FIG. 6(b) shows a second example of the stack trace information 370. Specifically, it shows an example of the stack trace information 370 produced when a servlet program which is a generation program is not translated from a JSP program which is a specification program. In the first line, the function identification information collector 250 outputs, as the stack trace information 370, information to the effect that an exception occurred in the Java⁶ language. Also, in the second line, the function identification information collector 250 outputs information to the effect that the name of the monitor function which caused the exception is ObservedPrintWriter.write and that the monitor function is described in the 83rd line of an ObservedPrintWriter.java file.

Furthermore, the function identification information collector 250 outputs information to the effect that the name of the function that has called the monitor function is java.io.PrintWriter.print, as the stack trace information 370. Similarly, the function identification information collector 250 displays the hierarchical structure of the functions called until the monitor function is called, as the stack trace information 370. Then, the function identification information collector 250 identifies functions beginning with the function which called the monitor function and ending with a predetermined function javax.servlet.http.HttpServlet.service which starts the generation program, as the hierarchical structure of functions which have called the monitor function. For example, according to the stack trace information 370 shown in FIG. 6(b), the function identification information collector 250 can identify that the generating command which calls the output function is described in the 125th line of a generation program SnoopServlet.java.

Figure 7:
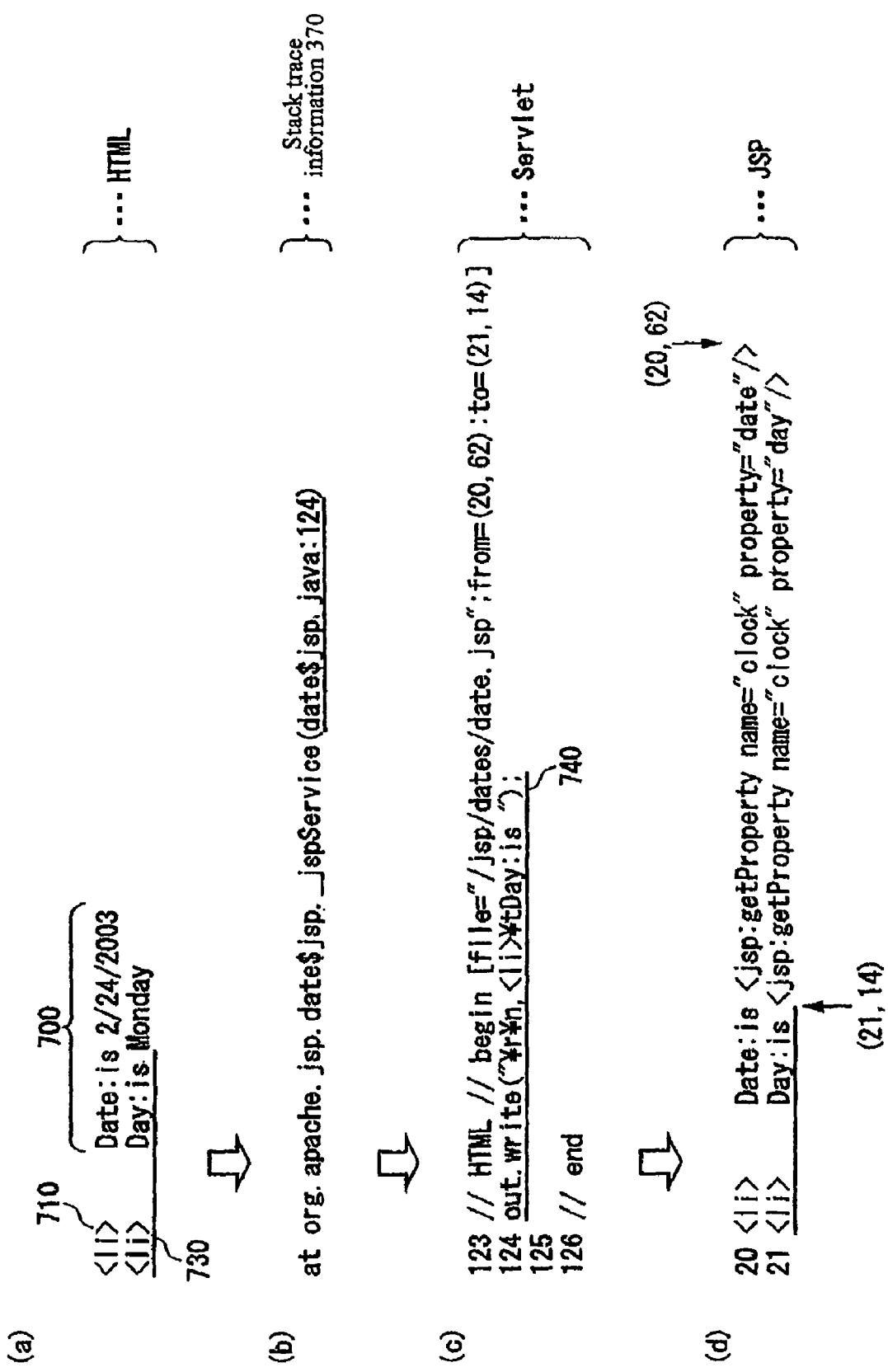
FIG. 7(a) shows an HTML document, which is an example of document information.
FIG. 7(b) shows an example of the stack trace information 370 obtained when the document component 730 shown in FIG. 7(a) is generated.
FIG. 7(c) shows an example of a generating command which generates the document component 730 shown in FIG. 7(a)
FIG. 7(d) shows an example of the specification command translated into the generating command shown in FIG. 7(c)

FIG. 7(a) shows an HTML document, which is an example of document information. The HTML document shown in the figure is an example of a tagged document and contains contents information 700 to be shown to the viewer of the document information, tag information 710 which specifies the display format of the contents information 700, and a document component 730. For example, the contents information 700 is displayed directly on the display screen 325 of a Web browser or the like while the tag information 710 instructs the Web browser or the like to itemize the contents information 700.

Thus, in FIG. 7(a), the tag information is provided as HTML tags for the HTML document, beginning with the symbol '<' and ending with '>.' Alternatively, the tag information may be part of an HTML tag or an HTML option which controls details of the display format of contents information. As an example, description will be given of the following HTML document which displays an image with a file name 'photo.gif.'

<IMG src="photo.gif" alt="">

In this example, the tag information may be '<IMG' and '>,' an HTML tag which indicates that an image will be displayed or it may be '<,' part of the HTML tag. Alternatively, the tag information may be 'alt="",' an HTML option which specifies information to be displayed instead of images in the absence of any image file or it may be '"",' which is an attribute value. In other words, the tag information may be a tag name, tag attribute, attribute value, or other information which indicates part of HTML tag description.

FIG. 7(b) shows an example of the stack trace information 370 obtained when the document component 730 shown in FIG. 7(a) is generated. For example, the function identification information collector 250 identifies based on the stack trace information 370 that the generating command which generates the document component 730 is the command described in the 124th line of the date$jspjava file.

FIG. 7(c) shows an example of the generating command which generates the document component 730 shown in FIG. 7(a). A generating command 740 is called in the 124th line of the date$jsp.java file. Incidentally, the program translator 210 generates, in the 123th line, information which identifies the specification command from which the generating command 740 is translated as a comment statement irrelevant to the generating command. FIG. 7(c) shows an example in which the program translator 210 is a Jasper or other JSP compiler. The figure indicates that the specification command translated into the generating command 740 is described in the range from the 62nd column in the 20th line to the 14th column in the 21st line of a JSP program named /jsp/dates/data.jsp.

FIG. 7(d) shows an example of the specification command translated into the generating command shown in FIG. 7(c). A JSP program which is an example of a specification program has a specification command '<li> Day:is' which indicates the content to be displayed as an HTML document and a specification command '<jsp:getProperty name="lock" property="day">' which indicates the content to be generated as the HTML document. In this way, at least part of the content to be displayed as an HTML document may be contained in the JSP program.

A specification command in a JSP program is smaller in size than a generating command in the generation program into which the JSP program is translated. For example, '<li> Day:is' which is underlined in FIG. 7(d) is smaller in size than the generating command 740 underlined in FIG. 7(c).

FIG. 7(d) shows the 20th and 21st line of the JSP program named /jsp/dates/data.jsp. As shown in FIG. 7(c), the specification command translated into the generating command 740 is described in the range from the 62nd column in the 20th line to the 14th column in the 21 st line of a JSP program named /jsp/dates/data.jsp in FIG. 7(d).

As shown in FIG. 7(d), the program translator 210 inserts information which indicates correspondence between the specification commands of a JSP program and the generating commands of a servlet program into the servlet program as a comment statement. Consequently, the correspondence information generator 260 can output correspondence information which associates document components with specification commands based on the comment statements in the stack trace information 370 and servlet program.

Alternatively, the function identification information collector 250 may collect document components and specification commands which specify contents of the document components by associating them with each other in the stack trace information 370. Specifically, depending on the implementation method of processes which execute servlet programs and implementation method of the program translator 210, information which indicates the location of a specification command such as date.jsp:21 may be available in the stack trace information 370 instead of date$jsp.java:124 shown in FIG. 7(b). In that case, the program translator 210 does not need to generate the comment statement shown in FIG. 7(c).

Figure 8:
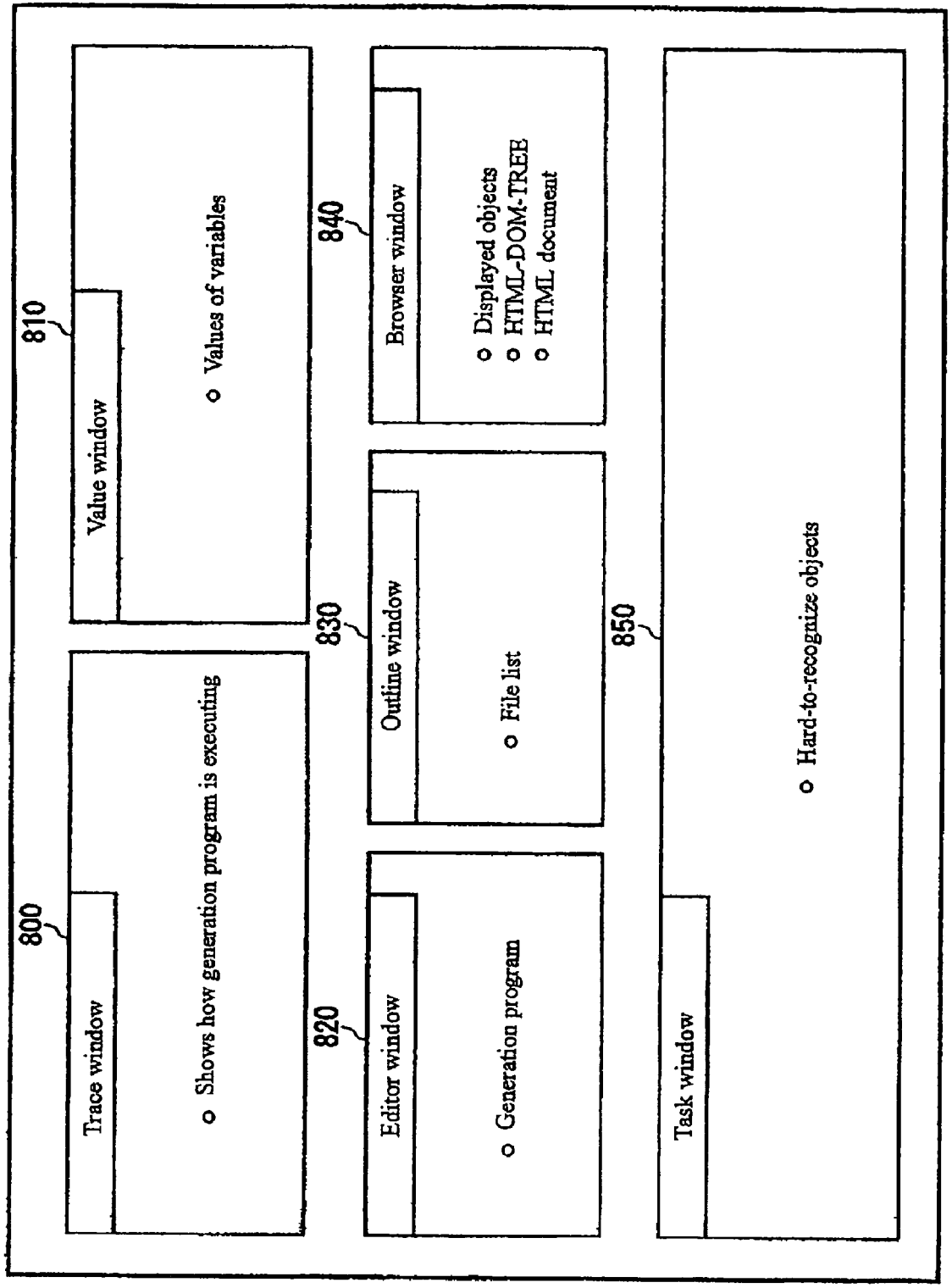
FIG. 8 shows a display example of a display screen 325.

FIG. 8 shows a display example of the display screen 325. The display screen 325 has a trace window 800 which shows what generating command is being executed by a generation program, value window 810 which shows the values of variables used by the generation program, editor window 820 which shows a plurality of generating commands contained in the generation program, outline window 830 which lists files containing programs used for execution of the generation program, browser window 840 which shows displayed objects displayed by an HTML document generated by the generation program, and task window 850 which displays displayed objects difficult for the user to recognize. The browser window 840 may display HTML-DOM-TREE or the HTML document together with the displayed objects.

In this way, the display unit 320 displays the displayed objects presented by the generation program and HTML document on the display screen 325. The selector 340 allows the user to specify some of the displayed objects presented in the browser window 840 on the display screen 325. Then, the selector 340 selects the contents information and tag information which has caused the specified displayed object to be displayed. In response, the command information output unit 350 outputs information which identify the generating command which has generated the contents information and tag information selected by the selector 340, for example, by highlighting the generating command in the editor window 820.

As another example, the display result analyzer/detector 330 detects hard-to-recognize objects which do not satisfy predetermined ease-of-recognition conditions from among the displayed objects presented in the browser window 840 and displays information for identifying the detected hard-to-recognize objects in the task window 850.

For example, when an HTML document presents displayed objects in the browser window 840, the display result analyzer/detector 330 may carry out an accessibility check to detect whether the displayed objects are easy for the user to recognize. As an example, the display result analyzer/detector 330 may be implemented using a Bobby program which carries out accessibility checks on HTML documents generated by JSP programs or servlet programs (see Non-Patent Document 2). In that case, regarding the displayed objects determined by the accessibility checks to be hard to recognize, the display result analyzer/detector 330 displays, in the browser window 840, the reasons why they are hard to recognize and line numbers of the displayed objects in the HTML document, by associating them with each other.

Then, the selector 340 selects the contents information and tag information which have caused the hard-to-recognize objects specified by the user out of those displayed in the task window 850 to be displayed in the browser window 840 of the display screen 325. In response, the command information output unit 350 displays, in the editor window 820, information for identifying the generating command which has generated the contents information and tag information selected by the selector 340.

In this way, each time a displayed object or document component is selected, the display screen 325 displays the corresponding generating command on the same screen. Consequently, the author of the generation program can find errors in the generation program by pointing out errors in the displayed objects in the browser window 840.

Figure 9:
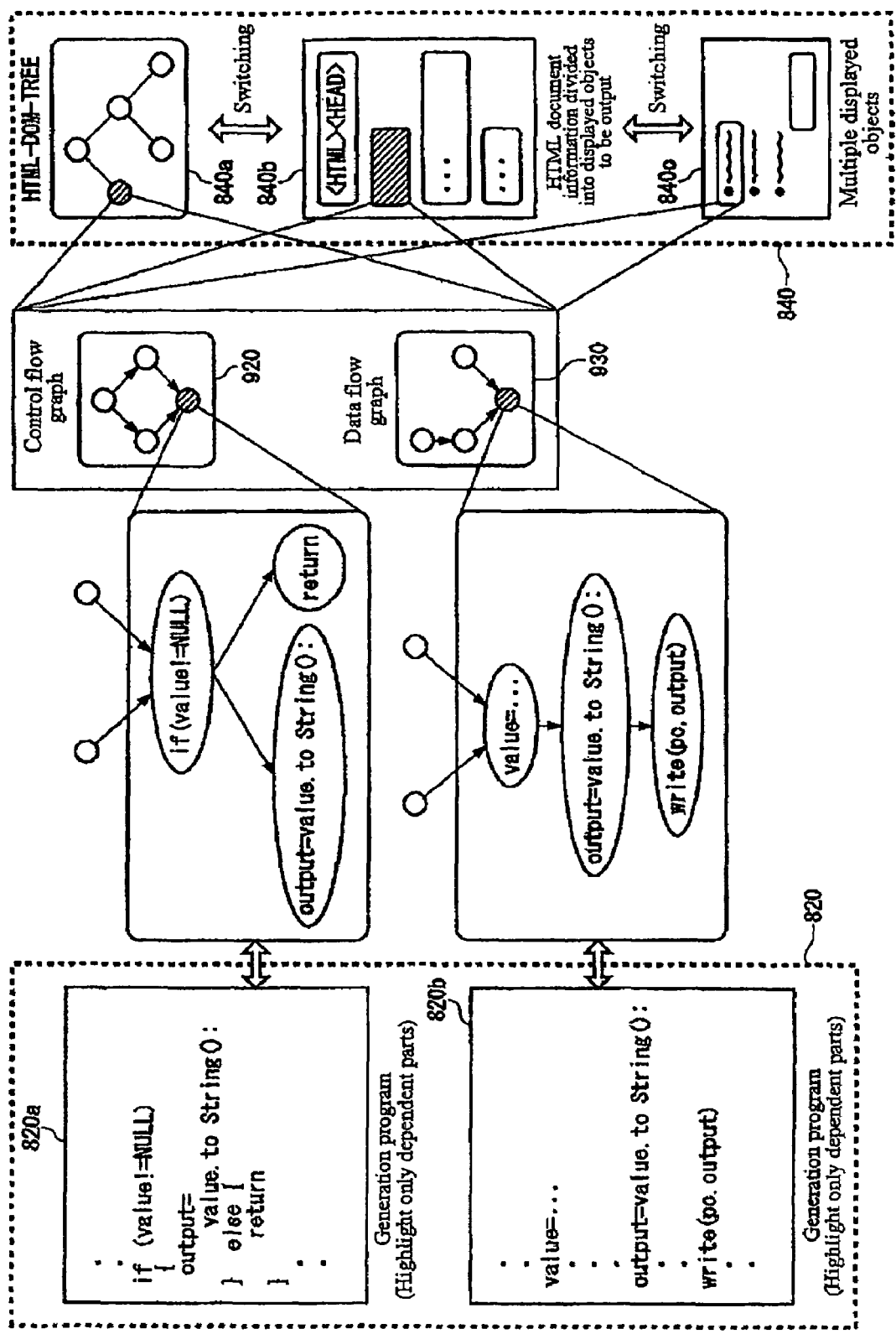
FIG. 9 is a conceptual diagram of a display presented by the display screen 325.

FIG. 9 is a conceptual diagram of a display presented by the display screen 325. When the display screen 325 presents displayed objects 840c on the browser window 840, the selector 340 allows the user to specify one or more of the displayed objects and selects document components which correspond to the displayed objects. Alternatively, the display screen 325 may display HTML-DOM-TREE 840a in the browser window 840 instead of the displayed objects 840c. In that case, the selector 340 allows the user to specify nodes of HTML-DOM-TREE 840a and thereby selects tag information indicated by the specified nodes.

Furthermore, the display screen 325 may display HTML-DOM-TREE 840a and an HTML document 840b in the browser window 840 by switching between them. Preferably, the display screen 325 displays the HTML document 840b by dividing it into the displayed objects to be output. In that case, the selector 340 selects one of document components by allowing the user to specify contents information and tag information in the HTML document 840b.

The command information output unit 350 selects the generating command which has generated the document component selected in the above process, based on the correspondence information, and outputs it, for example, to the editor window 820.

The control flow graph generator 220 generates a control flow graph 920 of the generation program in advance. Then, the command information output unit 350 further outputs control flow position information 820a to the editor window 820, with the control flow position information 820a indicating the position of the generating command selected based on the correspondence information in the control flow graph 920. Preferably, the command information output unit 350 highlights the selected generating command in the generation program as well as that part of the generating command into which control flows.

The data flow graph generator 230 generates a data flow graph 930 of the generation program in advance. Then, the command information output unit 350 further outputs data flow position information 820b to the editor window 820, with the data flow position information 820b indicating the position of the generating command selected based on the correspondence information in the data flow graph 930. Preferably, the command information output unit 350 highlights the selected generating command in the generation program as well as the part in which the command that generates the data used by the generating command is described.

In this way, the information processing system 10 outputs not only the generating command, but also those parts that affect the generating command, i.e., other commands which give data to the generating command and condition branching commands executed before the generating command. Consequently, the information processing system 10 can help the programmer understand dependencies between commands. Also, the information processing system 10 outputs only that part of the generation program which is directly relevant to the generating command. This allows the programmer to narrow down a problem area properly.

Figure 10:
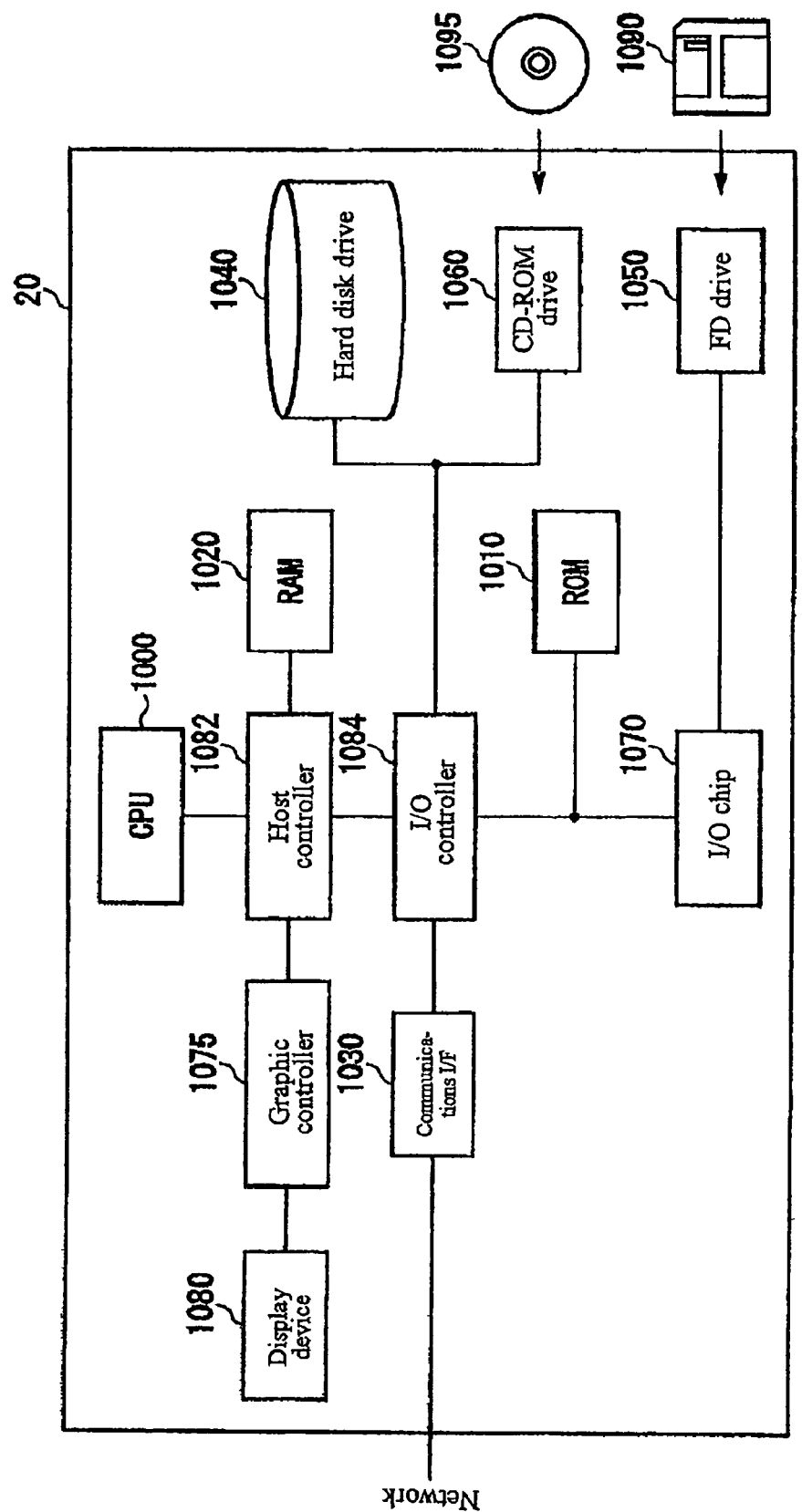
FIG. 10 shows an exemplary hardware configuration of a server machine 20.

FIG. 10 shows an exemplary hardware configuration of the server machine 20. The server machine 20 comprises a CPU 1000, RAM 1020, and graphic controller 1075, which are interconnected via a host controller 1082; CPU peripheral which has a display device 1080; communications interface 1030 connected to an input/output controller 1084 via the host controller 1082; input/output device which has a hard disk drive 1040 and CD-ROM drive 1060; ROM 1010 connected to the input/output controller 1084; flexible disk drive 1050; and legacy input/output device which has an input/output chip 1070.

The host controller 1082 connects the RAM 1020 with the CPU 1000 and graphic controller 1075 which access the RAM 1020 at a high transfer rate. The CPU 1000, which operates based on programs stored in the ROM 1010 and RAM 1020, controls various parts. The graphic controller 1075 acquires image data generated by the CPU 1000 and the like in a frame buffer provided in the RAM 1020 and displays it on the display device 1080. Alternatively, the graphic controller 1075 may incorporate a frame buffer for storing the image data generated by the CPU 1000 and the like.

The input/output controller 1084 connects the host controller 1082 with the communications interface 1030 which is a relatively high-speed input/output device as well as with the hard disk drive 1040 and CD-ROM drive 1060. The communications interface 1030 communicates with other devices via a network. The hard disk drive 1040 stores a control program and data used by the server machine 20. The CD-ROM drive 1060 reads a control program or data from a CD-ROM 1095 and provides it to the input/output chip 1070 via the RAM 1020.

The input/output controller 1084 is connected with the ROM 1010 as well as with the flexible disk drive 1050, input/output chip 1070, and other relatively low-speed input/output devices. The ROM 1010 stores a boot program executed by the CPU 1000 at the startup of the server machine 20, programs dependent on hardware of the server machine 20, etc. The flexible disk drive 1050 reads a control program or data from a flexible disk 1090 and provides it to the input/output chip 1070 via the RAM 1020. The input/output chip 1070 connects the flexible disk 1090 with various input/output devices, for example, via a parallel port, serial port, keyboard port, mouse port, etc.

The control program provided to the server machine 20 is provided by the user, being stored in a recording medium such as a flexible disk 1090, CD-ROM 1095, or IC card. It is read out of the recording medium, installed on the server machine 20 via the input/output chip 1070, and run on the server machine 20.

The control program installed and run on the server machine 20 includes a program translation module, control flow graph generating module, data flow graph generating module, buffer module, buffer stopper module, function identification information collector module, and correspondence information generating module. The operations which these modules make the server machine 20 perform are the same as the operations of the corresponding members in the server machine 20 described with reference to FIGS. 1 to 9, and thus description thereof will be omitted.

The server machine 20 may send the client machine 30 a control program for operating the client machine 30 so that the control program will be run on the client machine 30. The control program provided to the client machine 30 is provided by the user, being stored in a recording medium such as a flexible disk 1090, CD-ROM 1095, or IC card. It is read out of the recording medium, provided to the server machine 20 via the input/output chip 1070, and run on the client machine 30.

The control program installed and run on the client machine 30 includes an input accepting module, operation mode switching module, display module, document structure information output module, display result analyzer/detector module, selection module, and command information output module. The operations which these modules make the client machine 30 perform are the same as the operations of the corresponding members in the client machine 30 described with reference to FIGS. 1 to 9, and thus description thereof will be omitted.

The control programs and modules described above may be stored on an external storage medium. The external storage medium may be not only the flexible disk 1090 or CD-ROM 1095, but also an optical recording medium such as a DVD or PD, magneto-optical recording medium such as an MD, tape medium, or semiconductor memory such as an IC card. Alternatively, a hard disk or RAM installed in a server system connected to a private communications network or the Internet may be used as a recording medium and the control programs may be supplied to the server machine 20 and client machine 30 via the network.

As can be seen from the above embodiment, the information processing system 10 executes a servlet program for generating an HTML document and generates correspondence information which indicates correspondence between generating commands and respective document components generated by the generating commands. Then, the information processing system 10 selects a document component at the instruction of the user and outputs the generating command which corresponds to the document component. This allows the author of the servlet program to properly identify the generating command which corresponds to a desired document component.

Regarding a JSP program translated into a servlet program, the information processing system 10 also generates correspondence information which indicates correspondence between specification commands in the JSP program and respective document components. This allows the author of the JSP program to properly identify the generating command which corresponds to a desired document component. Furthermore, the information processing system 10 aids the programmer with his/her tasks by outputting information about the position of the identified generating command and specification command on a control flow graph or data flow graph.

The information processing system 10 displays an HTML document on the browser screen, allows the user to select displayed objects, and thereby selects document components. Furthermore, the information processing system 10 generates document structure information (e.g., HTML-DOM-TREE) which indicates the structure of the HTML document, allows the user to select nodes of a graph which represents document structure information, and thereby selects document components. This is convenient because the programmer can select an appropriate input method according to the nature of program modification.

The present invention has been described above by way of an embodiment, but the technical scope of the present invention is not limited to the scope of the embodiment described above. Various modifications or improvements can be made to the embodiment described above. It is obvious from the appended claims that results of such modifications or improvements can also be included in the technical scope of the present invention.

We claim:

1. A control method for controlling an information processing system which analyzes a generation program for generating document information consisting of a plurality of document components, wherein:

the generation program contains a plurality of generating commands for generating the plurality of document components, respectively, contained in the document information, said plurality of commands including commands that are generated by another one of said plurality of commands; and the control method comprises:

a translation step, comprising:

receiving a request for a document to be displayed, and acquiring one of a generation program or a specification program from a client machine depending on a received display request, wherein if a specification program is acquired, said specification program is translated into a generation program;

a correspondence information generating step of executing the generation program and generating correspondence information which indicates correspondence between the plurality of generating commands and document components generated by the generating commands, said corresponding information being generated to satisfy a predetermined condition selected from the group consisting of: outputting a corresponding document component at in predetermined line and a corresponding document component matching a predetermined character string;

a selecting step for selecting any of the plurality of document components at the instruction of a user, wherein when the user is provided with document structure information indicating the presence of a particular structure, then the user specifies a particular piece of structure information; wherein when the user specifies the particular piece of structure information, then a selector will select a related document component; wherein when a specific type of document is specified, then tag information specifying content or display information about any of those particular documents within that type is selected;

a command information output step of selecting, based on the correspondence information, the generating command which has generated the document component selected by the selector and outputting information for identifying the generating command;

a determining step where objects to be output are analyzed to determine if they are recognizable by the user, where ease-of-recognition conditions have been provided; and a switching step for switching between a test mode, in which document components are not stored, and a normal mode, in which documents components are stored, said switching step comprising determining a size of an output buffer set by a buffer stopper, wherein a size of said output buffer set to a zero (0) value stops said document components from being stored;

a collection step for collecting function identification information for associating a document component with an output function that has output the document component and the generating command that has called the output function;

an inserting step wherein a function identification information collector inserts a filter function into said generation program utilizing the function identification information collected, said filter function being executed each time the generation program is executed, wherein said filter function collects function identification information associating document components with the generating commands which have generated the document components; and a sending step for sending an operation mode setting instruction specifying the test mode or normal mode.

* * * * *